US007062818B2

(12) United States Patent
Jeffries

(10) Patent No.: US 7,062,818 B2
(45) Date of Patent: Jun. 20, 2006

(54) D-RING HANDLE

(75) Inventor: Mark Jeffries, Cumming, GA (US)

(73) Assignee: Austin Hardware & Supply, Inc., Lee's Summit, MO (US)

(*) Notice: Subject to any disclaimer, the term of this patent is extended or adjusted under 35 U.S.C. 154(b) by 214 days.

(21) Appl. No.: 10/224,262

(22) Filed: Aug. 20, 2002

(65) Prior Publication Data

US 2003/0182764 A1 Oct. 2, 2003

Related U.S. Application Data

(63) Continuation-in-part of application No. 10/063,187, filed on Mar. 28, 2002.

(51) Int. Cl.
*E05B 1/00* (2006.01)
*A47J 45/00* (2006.01)

(52) U.S. Cl. .............................. 16/445; 16/420; 16/444; 16/446; 16/419

(58) Field of Classification Search ................... 16/445, 16/419, 444, 446, 420, 408, 409, 430
See application file for complete search history.

(56) References Cited

U.S. PATENT DOCUMENTS

| | | | | | |
|---|---|---|---|---|---|
| 258,009 | A | * | 5/1882 | Blackham | 16/419 |
| 337,889 | A | * | 3/1886 | Taylor | 16/419 |
| 1,705,071 | A | * | 3/1929 | Sheehan | 16/445 |
| D119,418 | S | | 3/1940 | Anderson et al. | |
| 2,402,348 | A | | 6/1946 | Schroeder | |
| 2,540,686 | A | | 2/1951 | Milburn | |
| 2,638,370 | A | | 5/1953 | Price | |
| 2,666,319 | A | | 1/1954 | Price | |
| 2,715,243 | A | * | 8/1955 | Koll | 16/445 |
| 2,919,569 | A | | 1/1960 | Davis | |
| 2,923,145 | A | | 2/1960 | Labrie | |
| 3,682,807 | A | | 8/1972 | Ciepley | |
| 3,831,532 | A | | 8/1974 | Smith et al. | |
| 3,871,198 | A | | 3/1975 | Miller | |
| 4,009,506 | A | | 3/1977 | Henriksen | |
| 4,242,022 | A | | 12/1980 | Fredrickson | |
| 4,336,631 | A | * | 6/1982 | Duff et al. | 16/445 |
| D316,365 | S | | 4/1991 | Hansen et al. | |
| D316,366 | S | | 4/1991 | Hansen et al. | |
| D317,398 | S | | 6/1991 | Hansen et al. | |
| D318,007 | S | | 7/1991 | Hansen et al. | |
| 5,042,676 | A | | 8/1991 | Gohlke | |
| 5,052,869 | A | * | 10/1991 | Hansen, II | 410/111 |
| D323,776 | S | | 2/1992 | Hansen | |
| D323,970 | S | | 2/1992 | Schlack | |
| 5,339,487 | A | | 8/1994 | Kasper | |
| 5,450,735 | A | | 9/1995 | Esaki et al. | |
| 5,493,881 | A | | 2/1996 | Harvey | |

(Continued)

OTHER PUBLICATIONS

U.S. Trademark Registration No. 2,275,109 Registered Sep. 7, 1999 Hansen Manufacturing Company Design Registration for Vehicle Handle Assembly for Doors of Emergency Vehicles and Fire Trucks.

U.S. Trademark Registration No. 2,248,451 Registered Jun. 1. 1999 Hansen Manufacturing Company Design Registration for Vehicle Handle Assembly for Doors of Trucks, Utility Vehicles, and Rescue Vehicles.

*Primary Examiner*—John B. Walsh
(74) *Attorney, Agent, or Firm*—Polsinelli Shalton Welte Suelthaus PC

(57) ABSTRACT

The present invention relates to a handle member having a tab which, when pushed, allows the handle to be hingedly rotated from a resting position to a position substantially perpendicular to a faceplate member. In particular, the present invention relates to a D-ring handle having a tab, whereby the D-ring handle is hingedly connected to a faceplate member.

22 Claims, 10 Drawing Sheets

U.S. PATENT DOCUMENTS

| | | | | | |
|---|---|---|---|---|---|
| D389,393 | S | | 1/1998 | Hansen | |
| D390,770 | S | | 2/1998 | Burnley | |
| D393,197 | S | | 4/1998 | Burnley | |
| 5,794,994 | A | | 8/1998 | Miyagawa et al. | |
| 6,065,917 | A | | 5/2000 | Shambeau et al. | |
| D429,141 | S | | 8/2000 | Antonucci et al. | |
| D442,844 | S | | 5/2001 | Mirick | |
| 6,389,645 | B1 | * | 5/2002 | Polidoro | 16/405 |
| 6,397,436 | B1 | * | 6/2002 | Wang | 16/445 |
| 6,412,425 | B1 | | 7/2002 | Chen | |
| 6,421,882 | B1 | * | 7/2002 | Liao et al. | 16/445 |
| 6,467,130 | B1 | * | 10/2002 | Kurachi et al. | 16/438 |
| 6,502,871 | B1 | | 1/2003 | Malmanger | |
| D469,678 | S | * | 2/2003 | Teskey | D8/301 |
| 6,616,222 | B1 | * | 9/2003 | Ponceau | 296/214 |

* cited by examiner

D-RING HANDLE

This application is a continuation-in-part of patent application Ser. No. 10/063,187, filed on Mar. 28, 2002.

FIELD OF INVENTION

The present invention relates to a handle, preferably a D-ring handle, having a tab. The tab can be pushed to hingedly rotate the handle from a storage position, where the handle is in contact with a housing member, to a position where the handle can be turned to actuate a latch, or similar mechanism.

BACKGROUND OF INVENTION

D-ring handles, or handles of a similar construction, are often used in association with emergency vehicles, such as fire trucks and ambulances. The handles are located on doors and cabinet faces so that when a handle is lifted and turned, the door, or similar member is unlatched, and it can be opened. The D-ring construction is preferred for use with such vehicles because the D-ring can be turned or rotated more easily by a person wearing a glove, such as a fireman. A gloved hand can easily grab the D-ring to rotate it.

The D-ring typically is located within a housing member, which has an outer flange and a recessed faceplate. The D-ring will rest against the recessed faceplate member, which makes it difficult for a person, especially one who is wearing a glove, to slip their fingers behind the D-ring. Difficulty in slipping fingers behind the D-ring makes it difficult to hingedly rotate the D-ring so it is substantially perpendicular to the faceplate. As mentioned, once the D-ring is in a substantially perpendicular position, it can be rotated in a circular or semi-circular path to unlatch a door.

The D-ring, when in a closed position, flush against the recessed faceplate member, has a tendency to rotate, either counter clockwise or clockwise when the vehicle is in motion. This rotation can sometimes lead to the door to which the D-ring is attached, opening, leading to a potential safety hazard.

For the above reasons, it has been known to form a D-ring, whereby the curved leg portion of the D-ring is angled outward. This creates a larger space between the D-ring handle and the faceplate. A person wearing gloves can then more easily slip a finger behind the curved leg portion of the D-ring to hingedly rotate it outward to a substantially perpendicular position and then turn the handle.

The curved leg of the D-ring, which angles outward, is suitable for use; however, even with the curved leg, it often remains difficult for a person to slip a gloved finger behind the D-ring, making it difficult to hingedly rotate the D-ring to a position substantially perpendicular to the faceplate. In addition, it is advantageous to allow the leg to remain flush, or in contact, with the faceplate when not in use. For these reasons, it is desired to have a D-ring handle that can be easily gripped, rotated outward, and turned by a person wearing gloves, but which remains flush, or in contact, with the faceplate and does not rotate, when not in use. It is especially desired to have a D-ring that can be easily moved to a substantially perpendicular position, without the necessity of slipping a finger behind the leg to pry it away from the faceplate.

SUMMARY OF INVENTION

The present invention relates to a handle member having a tab. Preferably, the handle is a D-ring member having a leg and a base. The handle member is hingedly connected to a faceplate member and can be moved to actuate a latch. Preferably, the handle is turned in a circular, or semi-circular direction. When not in use, the handle will be in a resting position, whereby it is in contact with, and substantially coplanar to, the faceplate. Upon pushing the tab, the handle is hingedly rotated from the resting position to a position substantially perpendicular to the faceplate. This allows the handle to then be turned in a circular, or semi-circular path to actuate a latch or similar member.

The base and leg of the D-ring handle can be hingedly connected. In the present embodiment the hinged connection can be facilitated by a pin member, which includes a slideably mounted spring. The spring is situated between the tab and a foot member of the D-ring handle. The spring helps to hold the base member in the closed position, parallel to the faceplate. When force is applied to the tab, the spring uncoils, with the base member, and ultimately the handle, rotating away from the faceplate. Other members for providing tension to the hinged connection may be used.

The base member includes two tabs, or projections, protruding away from the base. These tabs contact the leg member when force is applied to the base member causing it to rotate. Thus, the tabs transfer energy from the base to the leg of the D-ring handle. While the tabs are preferred, any of a variety of constructions could be used to facilitate energy transfer, as long as the energy is transferred from the base to the handle to facilitate movement.

The present invention can include protrusions located on the leg of the D-ring handle and two bolts on either end of the base of the D-ring handle. The protrusions are substantially perpendicular to the leg of the D-ring handle. If the D-ring handle should rotate either clockwise or counter clockwise while in the closed position, the protrusions will contact the bolts, thereby blocking the rotation of the D-ring. This can happen as a result of vibrations of the truck or device which is carrying the handle. As such, the spring and protrusions are included to stifle unintended movement of the handle The present invention is advantageous over other D-ring handles, because it has a tab that can be pushed to easily move the handle from a resting position to a position, whereby the handle can be actuated. The present invention is also advantageous because the leg of the handle or D-ring handle does not have to have a curved outward construction. Instead, it can be placed in a resting position that is flat against the faceplate.

DETAILED DESCRIPTION

Figures 1, 2, 3, 4:
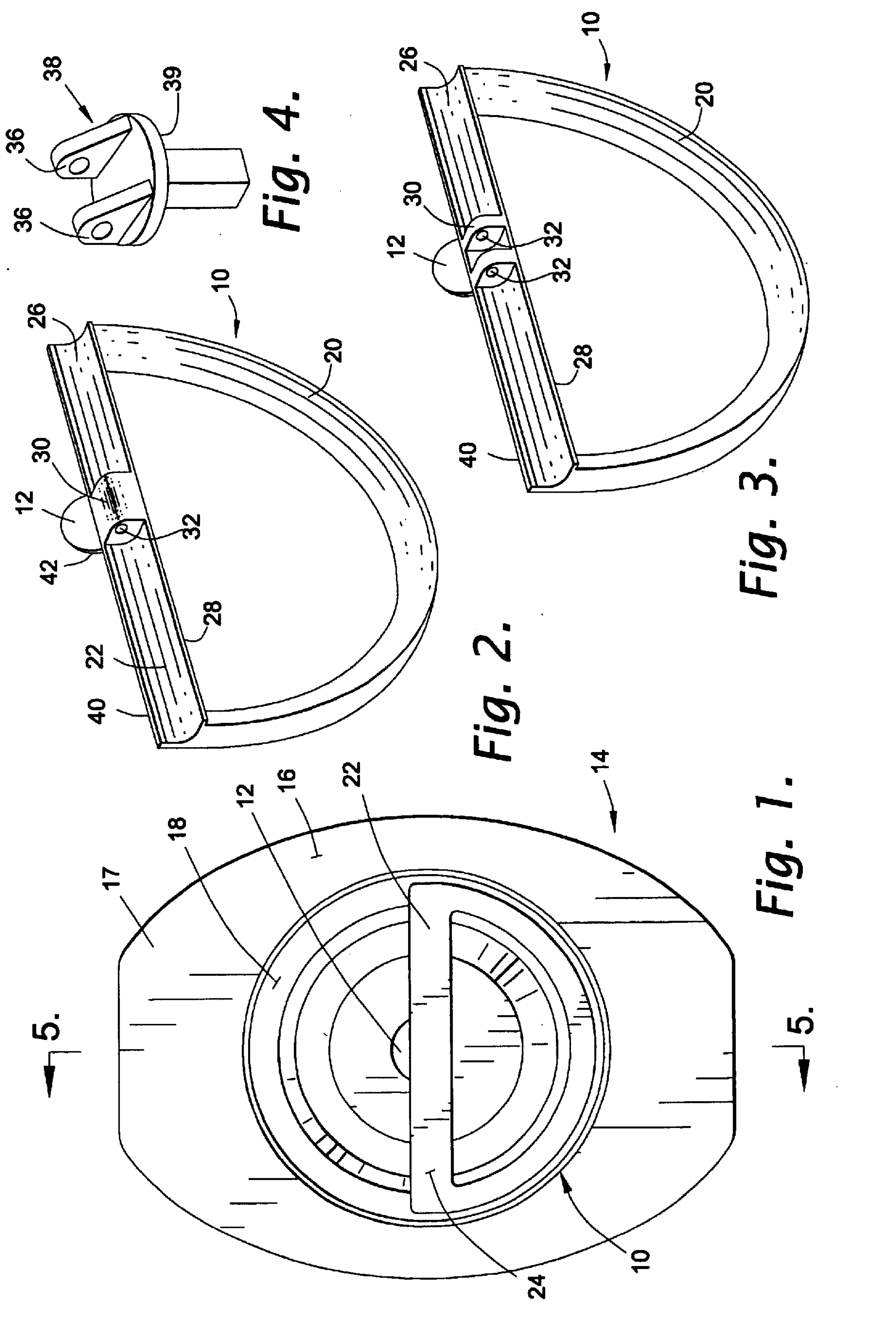
FIG. 1 is a front perspective view of the D-ring handle attached to a faceplate.
FIG. 2 is a side perspective view of the D-ring handle having a block member.
FIG. 3 is a side perspective view of the D-ring handle having a cut out block member.
FIG. 4 is a side perspective of the foot member on which the D-ring of FIGS. 2 and 3 will rotate.

The present invention relates to a handle member well-suited for use with emergency vehicles. The handle will rotate hingedly, and can be turned to actuate a latch, or similar member. Preferably, the handle is a D-ring handle 10 mounted in a housing, shown in FIGS. 1, 7, 13, and 19. The D-ring handle 10 and housing or substrate 14 is well-suited for use with emergency vehicles, such as fire trucks and ambulances. Included in the D-ring handle 10 construction is at least one tab member 12. The D-ring 10 is rotatably attached to the substrate member 14.

The faceplate, or substrate 14, will fit into a cut out found in a door or similar member. Preferably, the substrate member 14 is a faceplate having a flange 16 and a recessed face member 18. The faceplate has an outer edge 17 that is of any of a variety of shapes and dimensions. The D-ring 10 can be rotated in a circular path to actuate the movement of a latch or similar member so that a door can be unlatched and opened. As would be expected, the D-ring 10 does not have to rotate in a circular or semi-circular path. Instead, it could move in any direction or path which allows the latch to be actuated.

Figure 8:
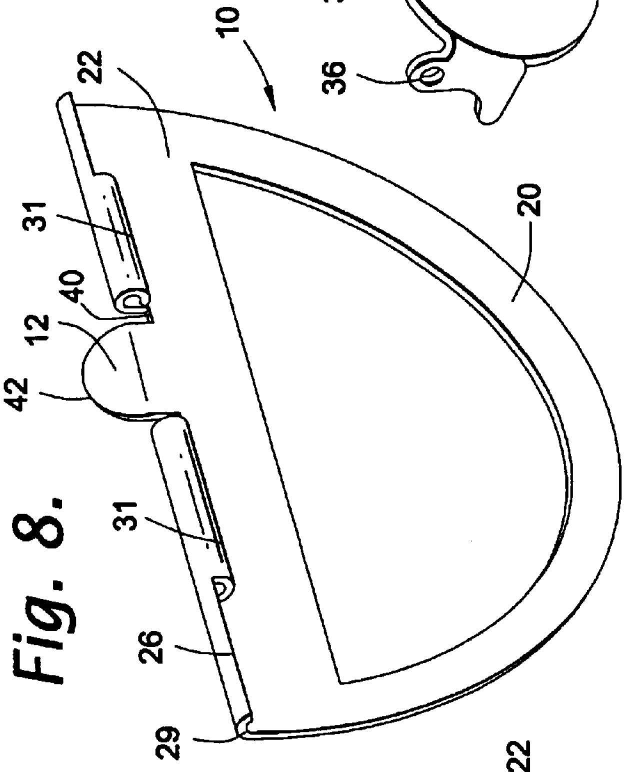
FIG. 8 is a side perspective view of the D-ring handle, shown in FIG. 7, having a pair of tubes.
Figure 14:
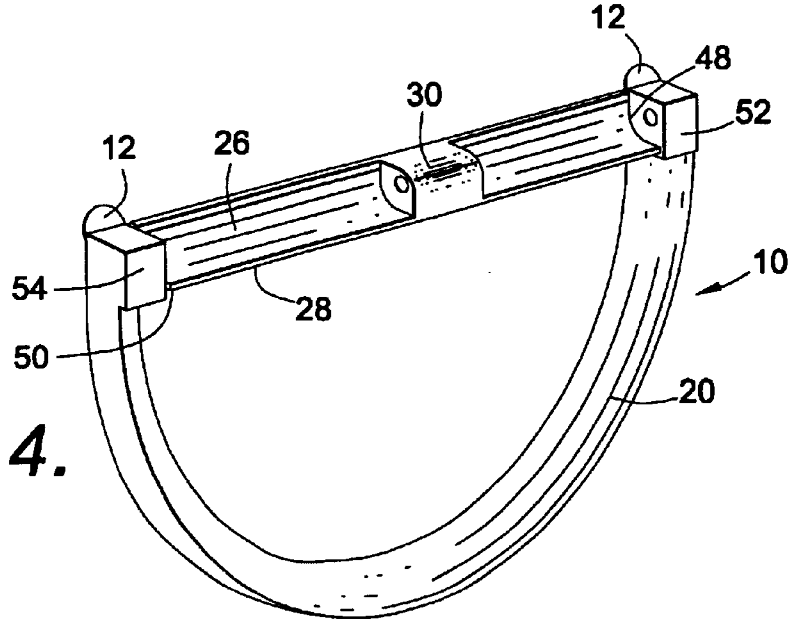
FIG. 14 is a side perspective view of the D-ring handle, shown in FIG. 13.
Figure 15:
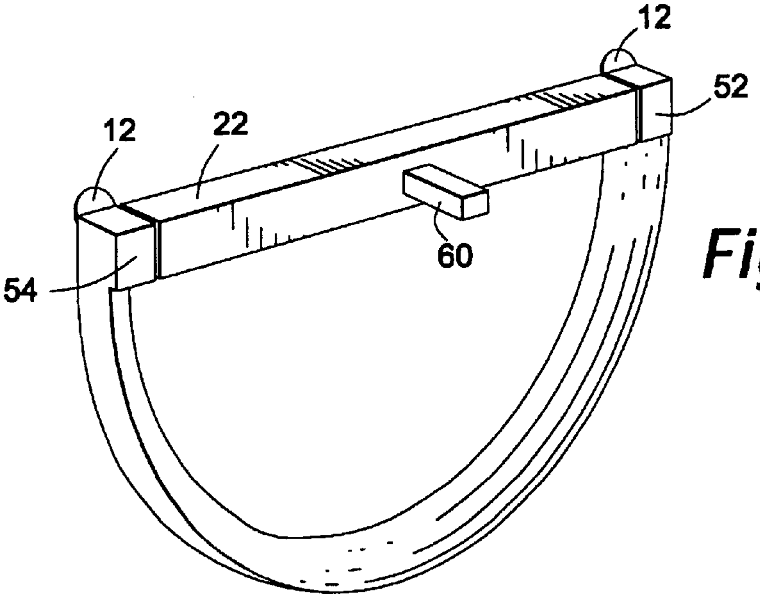
FIG. 15 is a side perspective view of an alternate embodiment of the D-ring handle shown in FIG. 13.
Figure 16:
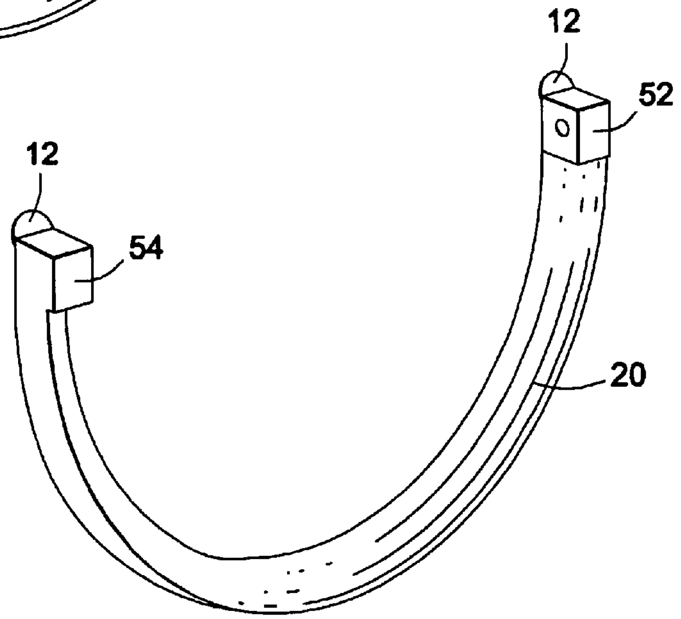
FIG. 16 is a side perspective view of the curved leg of the D-ring handle shown in FIG. 13.

The D-ring handle 10 is formed from a D-shaped ring member having a curved leg 20 and a base 22, shown in FIGS. 2 and 3. The leg 20 and the base 22 can be integrally attached to one another to form a unitary construction, as shown in FIGS. 2, 3, and 8. Alternatively, the curved leg 20 can be hingedly attached to the base member 22 so that the base member remains stationary when the curved leg is moved relative thereto, as shown in FIGS. 14 and 15. Preferably, the leg is hingedly rotated to a position substantially perpendicular to the base and faceplate. The dimensions of the curved leg 20 are such that it rests substantially flush within the recessed portion 18 of the faceplate 14. An alternative embodiment relates to the leg 20. While the curved leg is preferred, other shapes may be used. As long as the handle rests substantially coplanar to the recessed portion 18, any shape may be used. The handle can have a triangular, square, or T-shape, in the alternative. The handle can be biased to the closed position by use of a spring or similar device.

The base member 22 has a front face 24, shown in FIG. 1, and a back member 26, which are integral with one another. Generally, the base member 22 has a rectangular construction on its front face 24; however, a diamond shape, curved oblong shape, or other configuration can be used for the front face. The back member 26 can have an L-shaped construction, shown in FIG. 2, so that a ledge 28 is created on the back of the base member. The L-shaped construction of the back member increases the surface area to which the ends of the curved legs attach, thereby creating a stronger D-ring handle 10. The L-shaped construction places the ledge 28 in contact with the recessed portion 18 of the faceplate 14 when the D-ring handle is in its resting position, shown in FIGS. 1 and 5. Also, the L-shaped construction allows for easier attachment when connecting the handle 10 to the substrate 14.

Figure 5:
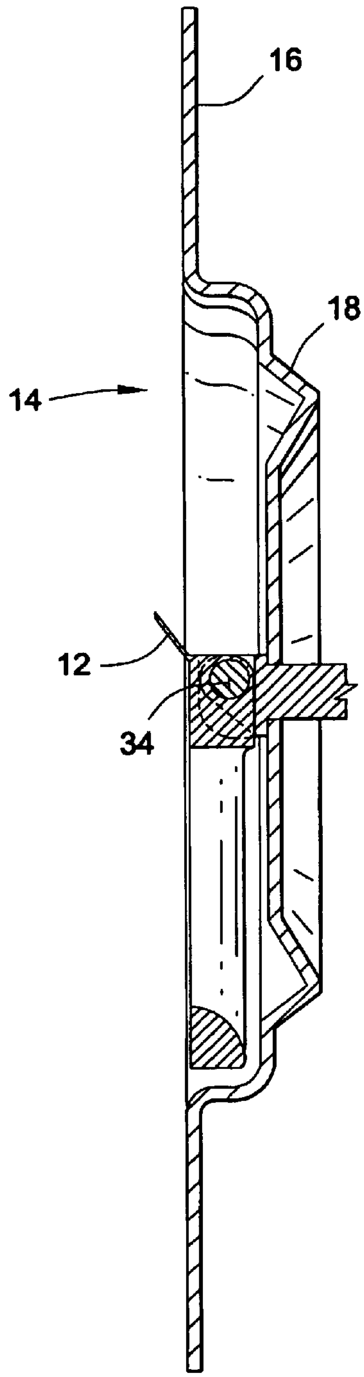
FIG. 5 is a side cutaway view of the D-ring handle, shown in FIG. 1, having a block member attached to the faceplate.
Figure 6:
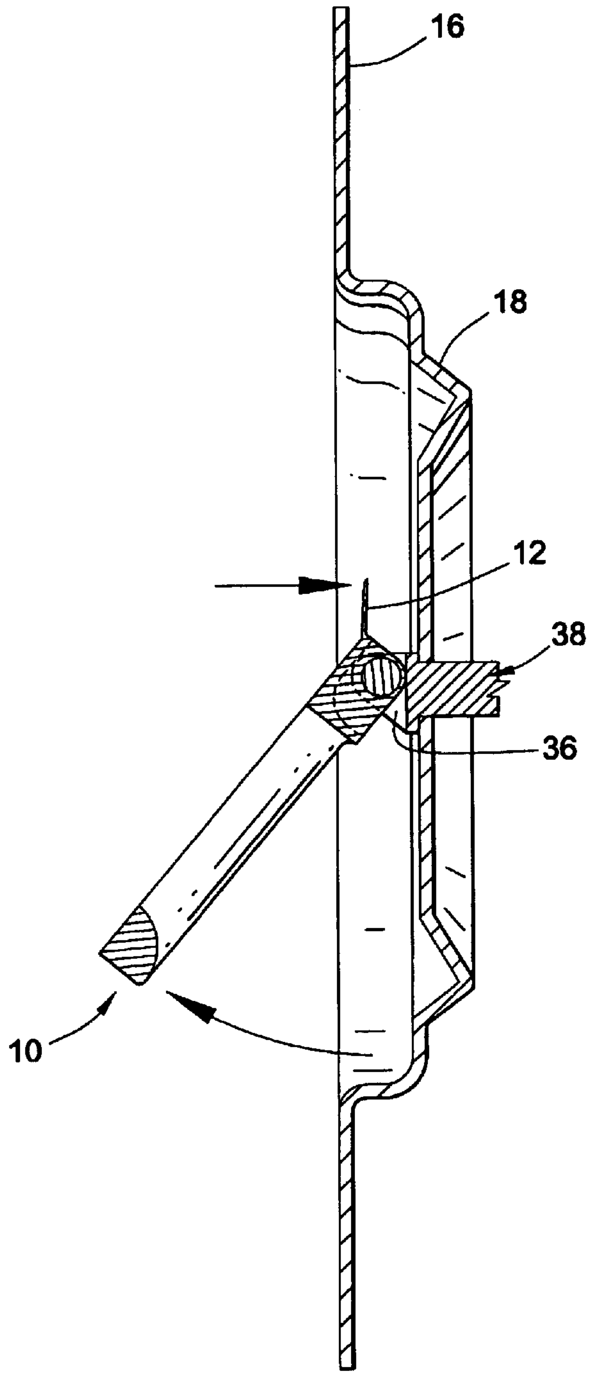
FIG. 6 is a side cutaway view showing the D-ring handle, shown in FIG. 1, having a block member, pivotally rotating on the faceplate.
Figure 9:
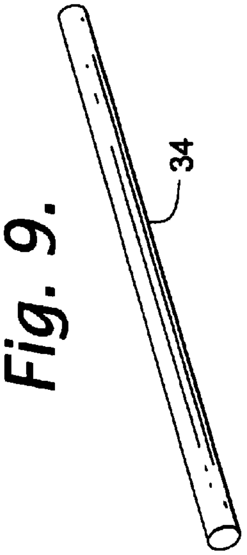
FIG. 9 is a side perspective view of the pin which rotatably attaches the D-ring handle to the foot member.

The D-shaped ring member 10 is hingedly, and rotatably, connected to the substrate member 14 as shown in FIGS. 5 and 6. Any of a variety of means for forming a hinged connection with the substrate 14 can be used. An actual hinged connection does not have to be formed with the substrate, instead, the D-ring can be hingedly moved relative to the substrate 14. In one embodiment, a block member 30 is integrally attached to the ledge of the L-shaped construction, shown in FIG. 2. The block member 30 will have a hole 32 that passes therethrough. A pin 34, shown in FIG. 9, is received and rotatably held by the hole of the block member, with the pin rotatably attached on opposite ends to a pair of opposed protrusions, or flanges 36. The protrusions 36 are attached to the base 39 of a foot member 38, shown in FIG. 4, which rotates relative to the substrate member 14 to actuate the latch member. The foot member is rotated either in a circular or semi-circular path. Thus, the block member 30 and protrusions 36 form a hinged connection, shown in FIGS. 5 and 6. The block member does not have to be solid. It can be cut out in the middle, as shown in FIG. 3. Alternatively, an actual hinged member can be used instead of the block member 30. Other block constructions may be used, as long as the D-ring handle 10 can be hingedly connected to the substrate member 14 and can be rotated to actuate the latching mechanism.

Figure 10:
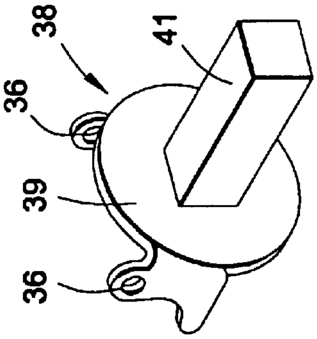
FIG. 10 is a side perspective view of the foot member on which the D-ring of FIG. 7 will rotate.
Figure 7:
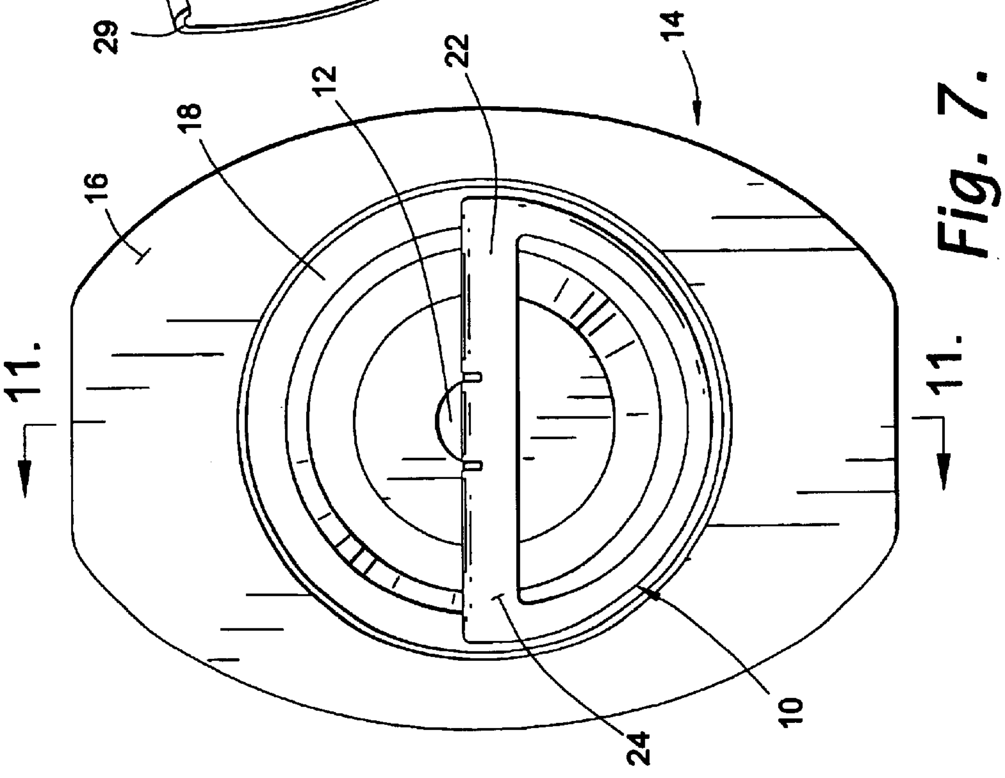
FIG. 7 is a front perspective view of an alternative embodiment of the D-ring handle attached to a faceplate.
Figure 11:
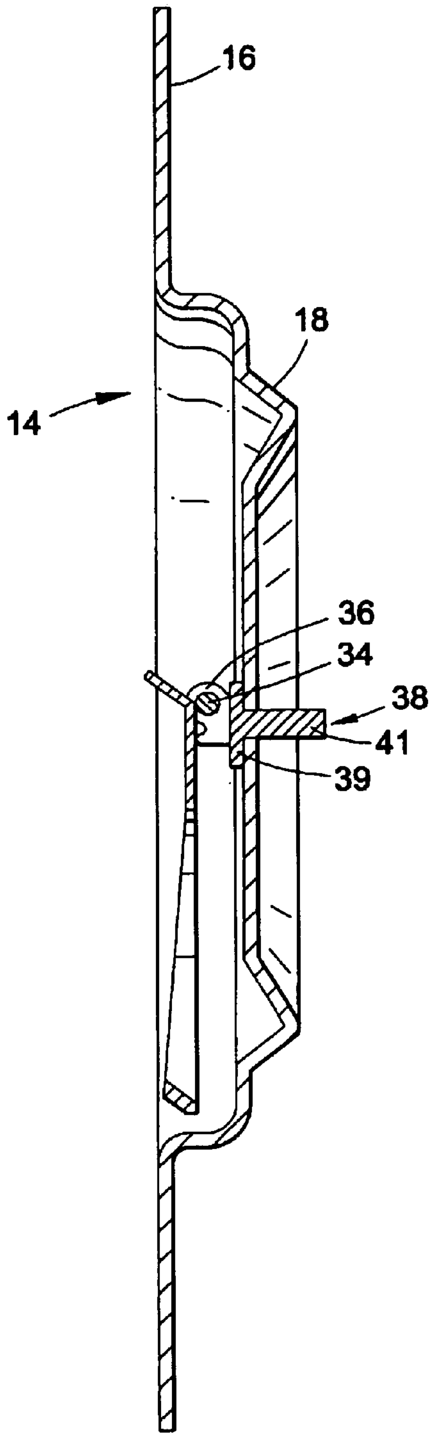
FIG. 11 is a side cutaway view of the D-ring handle, shown in FIG. 7.
Figure 12:
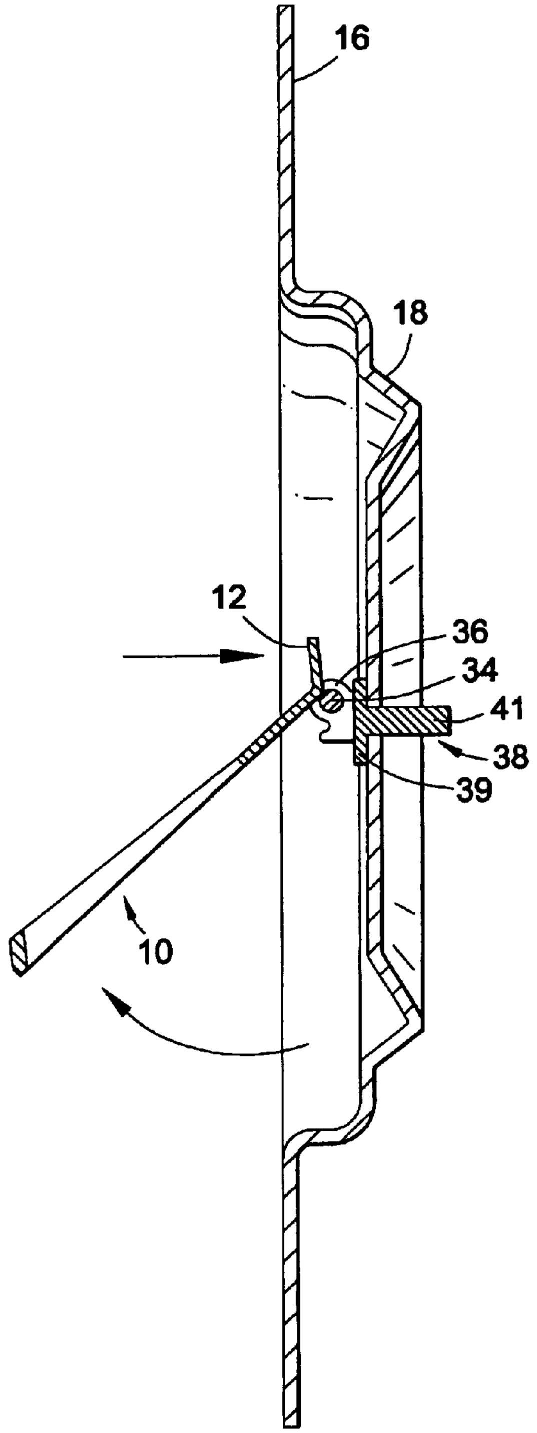
FIG. 12 is a side cutaway view of the D-ring handle, shown in FIG. 7, showing one tube pivotably rotating on the faceplate.
Figure 13:
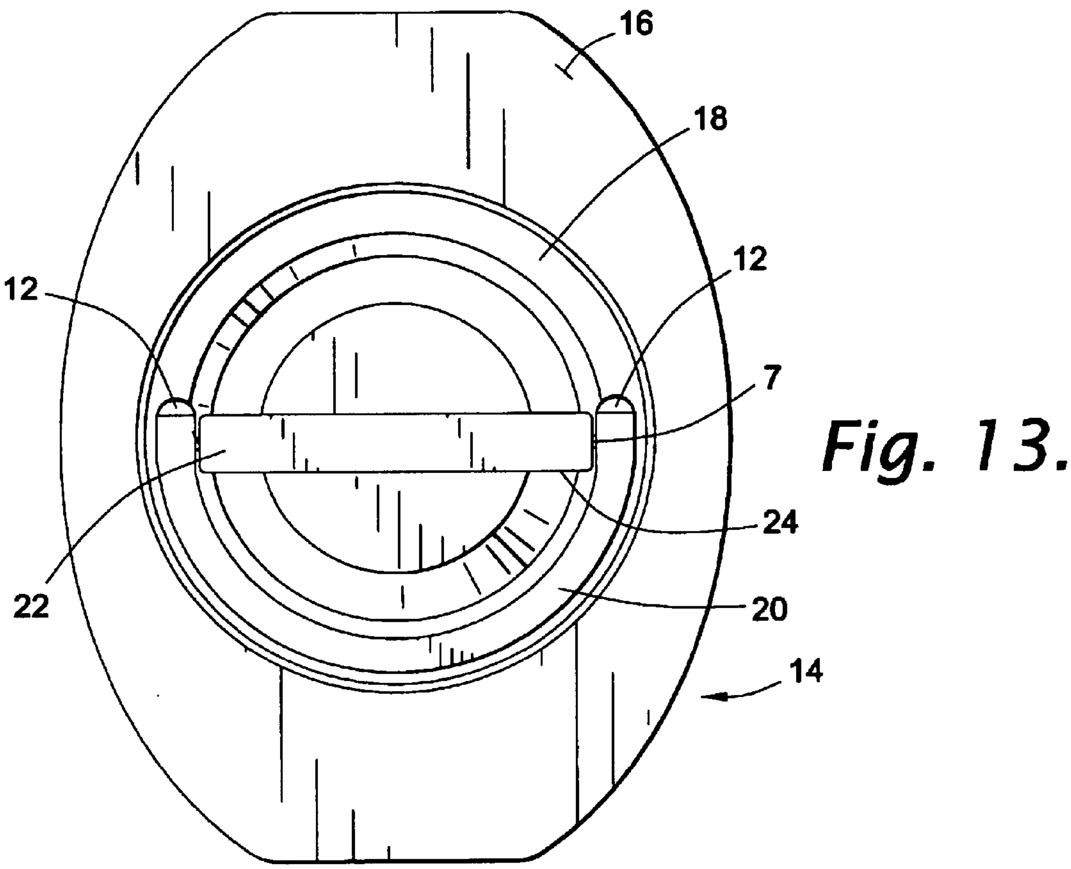
FIG. 13 is a front perspective view of an alternative embodiment of the D-ring handle attached to a faceplate.

An alternative embodiment of the invention shown in FIG. 7 includes two or more tube members 31 attached to the base member 26. The base member has a J-shaped construction, shown in FIG. 8, so that a curve 29 is created on the back of the base member. The two or more tube members are integrally attached to the curve 29 of the base member 26. A pin 34, shown in FIG. 9, is received and rotatably held by the tube members, with the pin rotatably attached to a pair of opposed protrusions, or flanges 36. The opposed protrusions are attached to a foot member 38, shown in FIG. 10. The opposed protrusions are integrally attached to one side of a base 39 at one end of the foot member. The base can be any of a variety of shapes which allow the opposed protrusions to be attached to it. The base can be circular, rectangular, square, triangular, etc. A rectangular rod 41 is integrally attached to the side of the base opposite the protrusions. The foot member rotates relative to the substrate member so that the rectangular rod actuates the latch member as shown in FIGS. 11 and 12. The foot member is rotated either in a circular or semi-circular path. Thus, the tube members 31 and protrusions 36 form a hinged connection.

Figure 17:
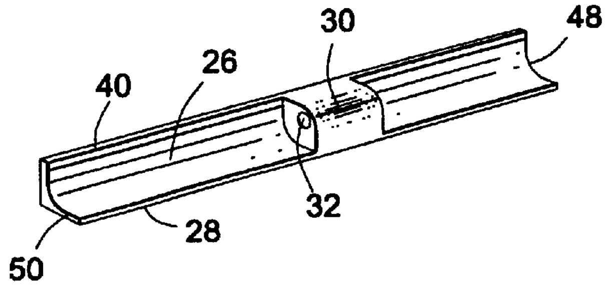
FIG. 17 is a side perspective view of the base member of FIG. 14.
Figure 18:
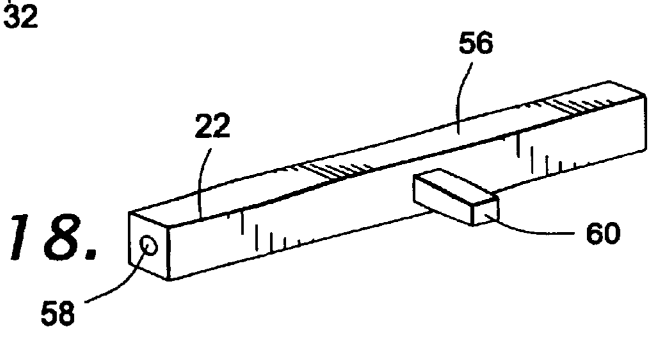
FIG. 18 is a side perspective view of the base member of FIG. 15.
Figure 19:
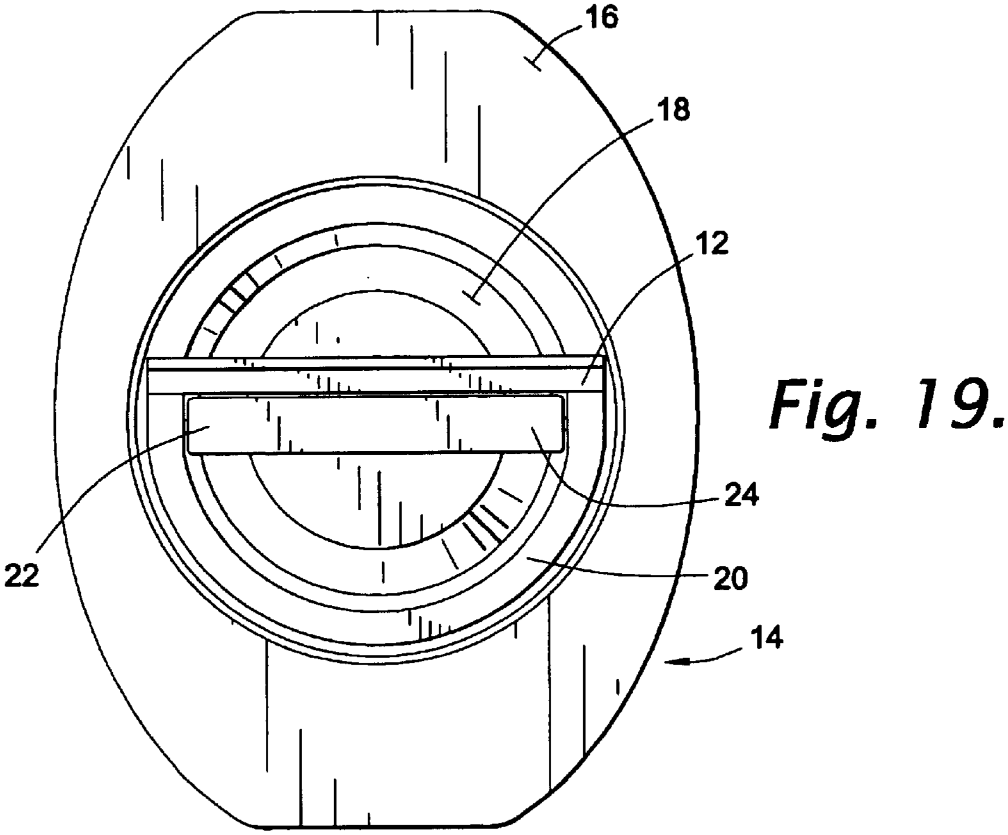
FIG. 19 is a front perspective view of an alternative embodiment of the D-ring handle attached to a faceplate.
Figure 20:
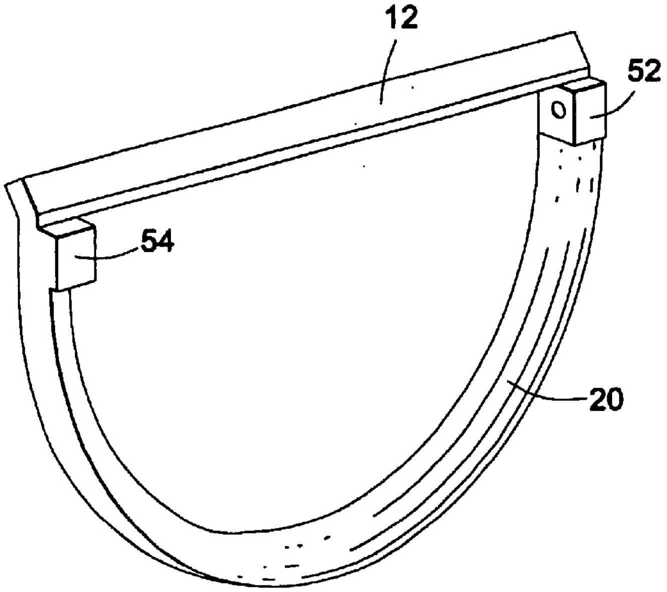
FIG. 20 is a side perspective view of the curved leg of the D-ring handle shown in FIG. 19.

If the D-ring 10 does not have an integral construction and, instead, the curved leg 20 is hingedly affixed to the base member 22, the pin 34, shown in FIG. 9, can be used to hingedly attach each end 52 and 54 of the leg 20 to each end 48 and 50 of the base 22, as shown in FIGS. 13–15, 19, 21, 22, and 27. In this embodiment, the base member 22 will include ends 48 and 50, shown in FIGS. 17 and 24, which are hingedly attached to the ends 52 and 54 of the curved leg 20, shown in FIGS. 14, 15, 22, and 27. The base member can be a rectangular shaped rod 56 having a hole 58 through its entire length for the pin 34 to pass through and a foot member 60 integrally attached at the middle of the rod 56, as shown in FIGS. 15 and 18.

In a further embodiment in which the curved leg is hingedly attached to the base member, the base member is a rectangular shaped rod having a pin attached to each end of the rod. The pins of the rectangular rod are inserted in the holes at each end of the curved leg to hingedly attach the rectangular rod to the curved leg.

Figure 22:
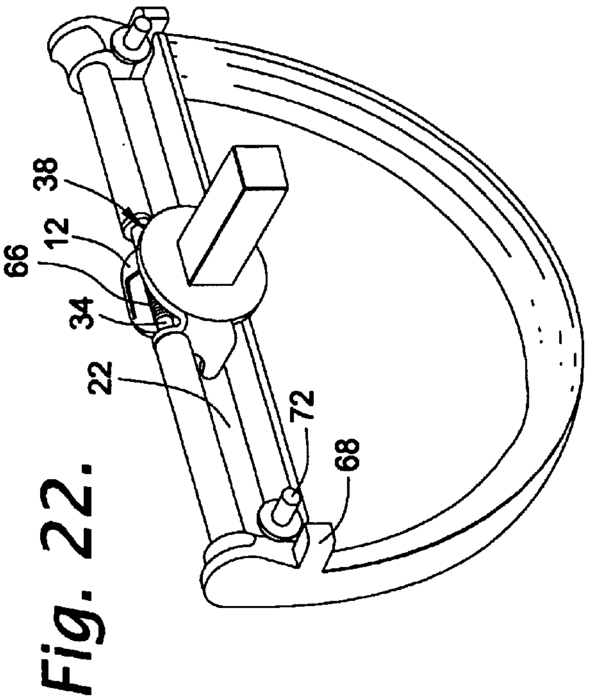
FIG. 22 is a side perspective view of the D-ring handle, shown in FIG. 21.
Figure 21:
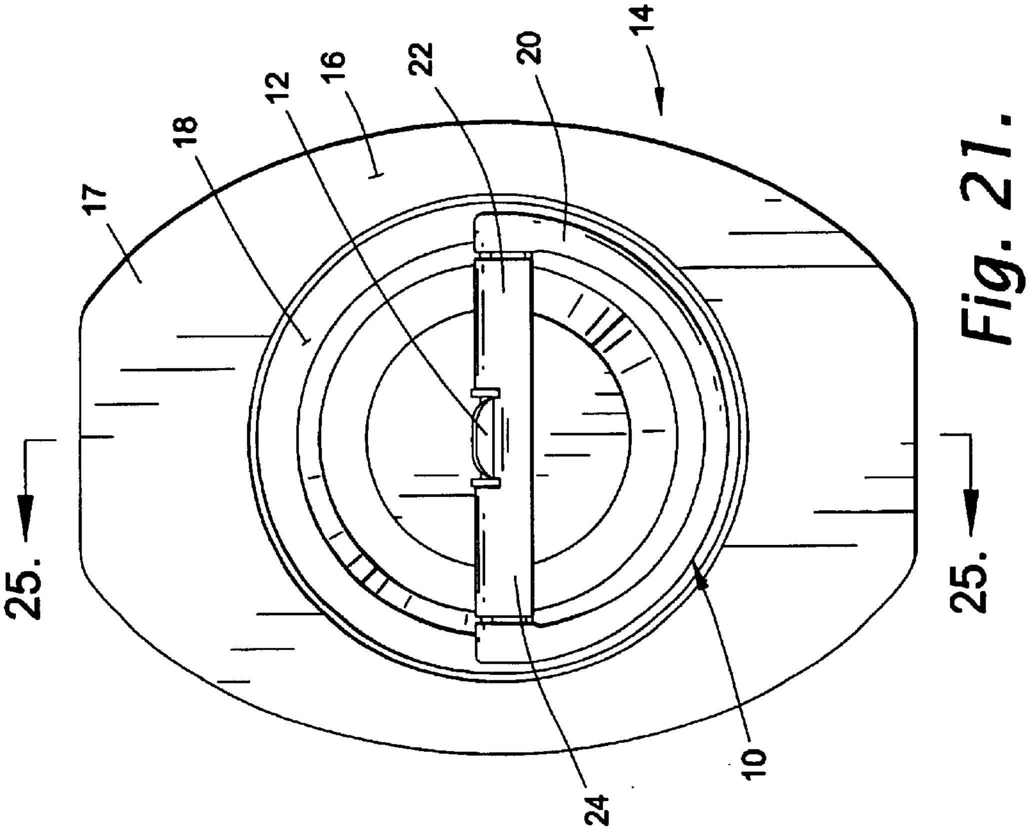
FIG. 21 is a front perspective view of an alternative embodiment of the D-ring handle attached to a faceplate.
Figure 23:
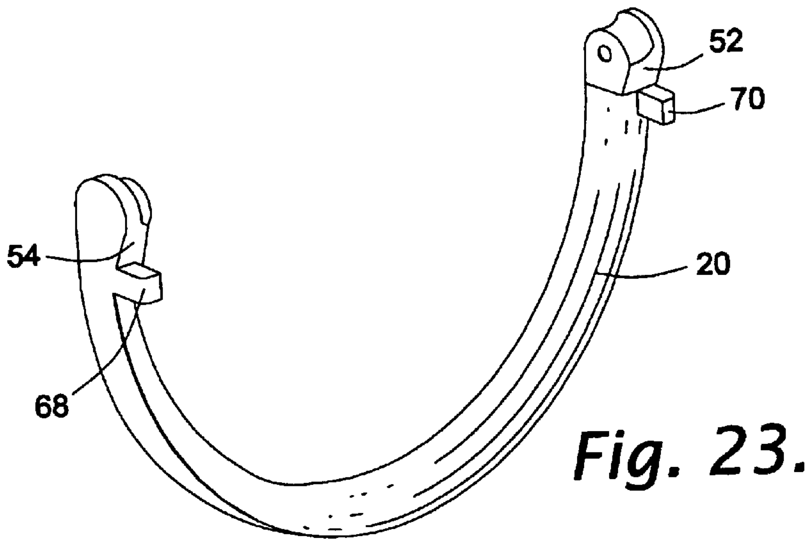
FIG. 23 is a side perspective view of the curved leg of the D-ring handle shown in FIG. 21.
Figure 24:
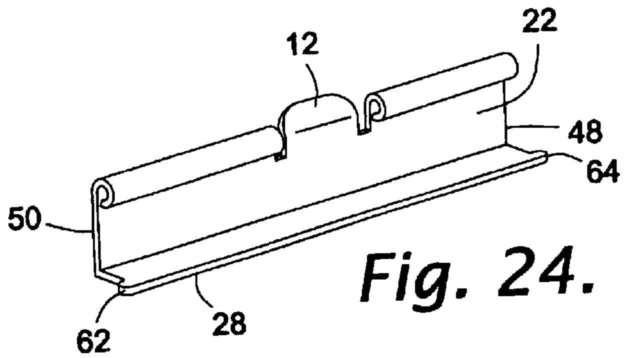
FIG. 24 is a side perspective view of the base member of FIG. 22.
Figure 27:
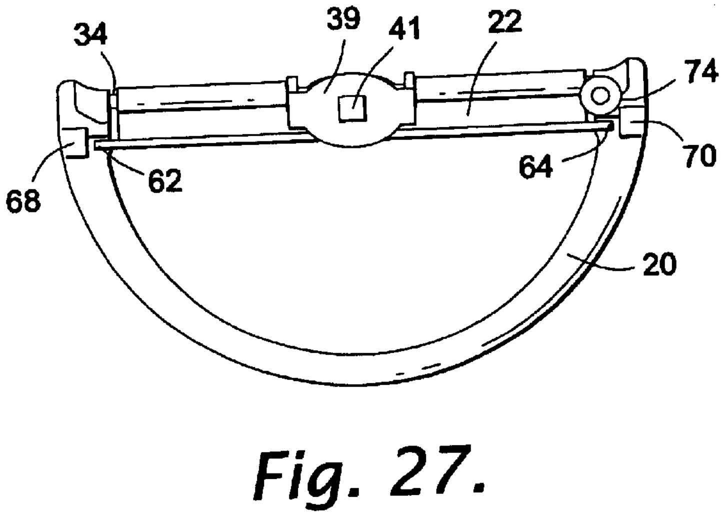

An alternative embodiment of the invention is shown in FIGS. 21–27, whereby the curved leg 20 is hingedly attached to the base 22, as shown in FIGS. 21 and 27. The embodiment includes two protruding tabs 62 and 64 integrally attached to each end 50 and 48 of the base 22, at the ledge 28, as shown in FIG. 24. The tabs 62 and 64 are in the same plane as the ledge and extend lengthwise away from the ledge 28. The protruding tabs 62 and 64 of the base 22 contact the curved leg 20, FIG. 23, such that when tab 12 is pushed, the tabs 62 and 64 transfer the motion to the curved leg 20 and push it away from the faceplate. In this embodiment, the tab member 12 is integrally attached to the base member 22, as shown in FIGS. 21, and 24 through 26. Thus, when force is exerted on the tab member 12, causing the base 22 to rotate away from the substrate 14, the protruding tabs 62 and 64 transfer energy from the base to the curved leg 20 by contacting the curved leg 20 portion of the D-ring handle and pushing it away from the substrate 14. This transfer of energy pushes the curved leg 20 away from the substrate 14, thereby making it easier for the user to grasp and turn the D-ring handle. The use of protruding tabs is preferred, however, any means of transferring the energy from the base 22 to the curved leg 20 can be used, so long as the D-ring handle can lie flush against the substrate 14 when not in use and can be pushed away from the substrate.

Figure 25:
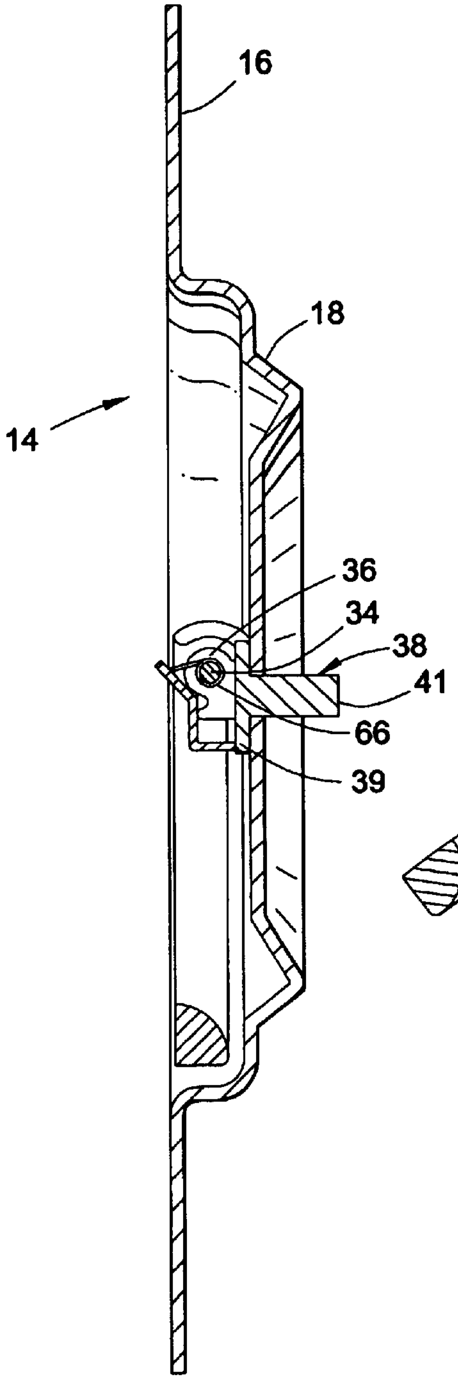
FIG. 25 is a side cutaway view of the D-ring handle, shown in FIG. 21.
Figure 26:
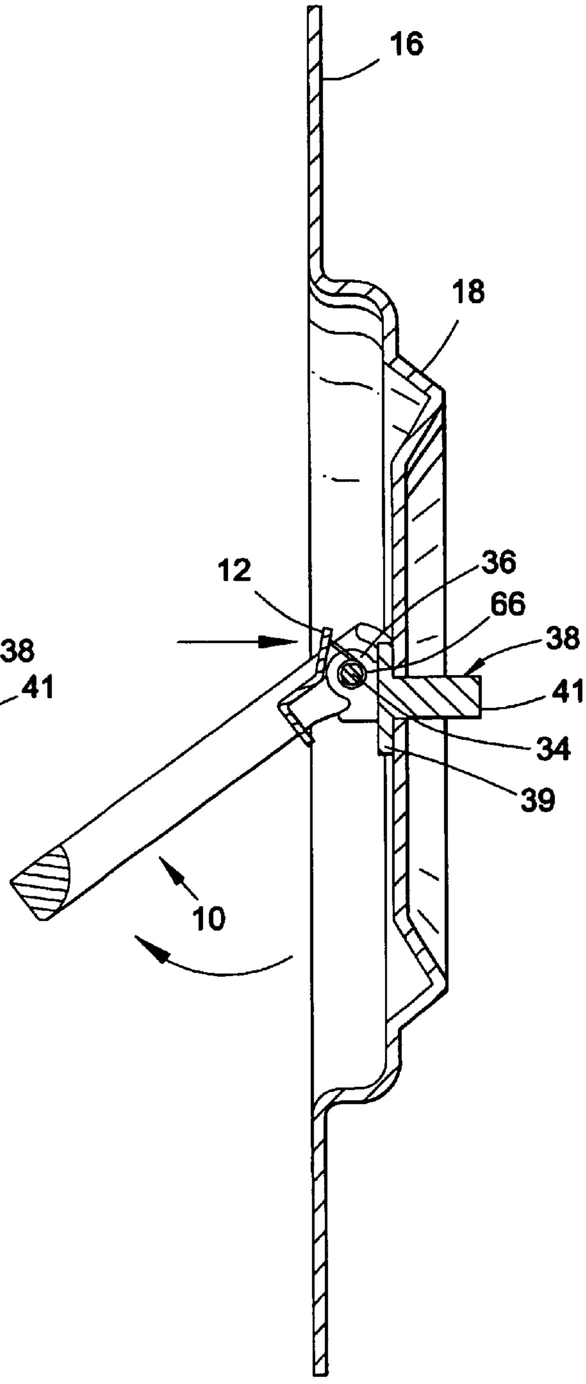
FIG. 26 is a side cutaway view showing the D-ring handle, shown in FIG. 21, pivotally rotating on the faceplate; and, FIG. 27 is a back perspective view of the D-ring handle, shown in FIG. 22.

The hinged D-ring handle construction can further include a member for holding the base member 22 in a closed position. A spring member 66 located on the pin 34, as shown in FIGS. 22, 25, and 26, is the preferred device for use in retaining the base member 22 in a closed position. The spring member 66 is positioned on the pin 34 so that it lies between the tab member 12 and the base 39 of the foot member 38, as shown in FIG. 22. When force is applied to the tab member 12, the spring member 66 uncoils as the base member 22 rotates to an open position, as shown in FIG. 26. When the curved leg is in an outward position and the force is removed from the tab member 12, the spring member 66 recoils, thereby returning the base 22 to the closed position, flat against the substrate 14.

As part of the alternative embodiment, the curved leg 20 can include two protrusions 68 and 70, as shown in FIGS. 22 and 23. These protrusions 68 and 70 are substantially perpendicular to the curved leg 20. Related to the protrusions are two bolts 72 and 74, which are attached to the base member 22, as shown in FIG. 22. The bolts 72 and 74 are attached to the base member on one end and contact the substrate 14 on the other end. As the D-ring handle rotates clockwise or counter clockwise, one of the protrusions 68 and 70 will contact one of the bolts 72 or 74. The contact is such that extraneous movement by the handle is prevented. Prevention of extraneous movement by the handle is important to prevent an unintentional opening of the door.

The tab member 12 is integrally attached to the top edge 40 of the base 22, shown in FIGS. 1–3, 5–8, 11, and 12. A tab can also be attached to each end of the leg, shown in FIGS. 13–16. The tab can be integrally attached to each end 52 and 54 of the curved leg 20, above the base member 22, shown in FIGS. 19 and 20. The tab is pushed by a user of the D-ring, to pivot and move the leg of the D-ring away from the faceplate, to a substantially perpendicular position, as shown in FIGS. 6 and 12. When the tab 12 is pushed, the D-ring will hingedly rotate, whereby a user can easily grab the handle 10. The tab can be any of a variety of lengths and widths, and more than one tab may be used. Preferably, the tab 12 will project away from the top edge at an angle of about 45°, as shown in FIGS. 5, 6, 8, 11, 12, and 20. Other angles, however, can be used, as long as the D-ring can be rotated about 90°. The tab 12 is, preferably, integrally attached to the top edge 40 of either the base or the curved leg. The tab can have any of a variety of constructions. Preferably, the outer edge 42 of the tab 12 is a semi-circular shape. The edge 42 can have other shapes, such as triangular, U-shape, T-shape, square shape, or rectangular.

Preferably, the D-ring handle is made from metal, such as stainless steel; however, other types of metals or solid materials can be used, such as aluminum, zinc, or plastic.

Thus, there has been shown and described a D-ring handle, which fulfills all the objects and advantages sought therefor. It is apparent to those skilled in the art, however, that many changes, variations, modifications, and other uses and applications for the D-ring handle are possible, and also such changes, variations, modifications, and other uses and applications which do not depart from the spirit and scope of the invention are deemed to be covered by the invention, which is limited only by the claims which follow.

What is claimed is:

1. A D-ring handle comprising:

(a) a D-shaped ring member including, a curved leg and a base, the base pivotally coupled to the curved leg;

(b) at least one tab connected to the base, the base configured with respect to the curved leg such that pressure on the at least one tab moves the base and the curved leg outward; and, (c) the D-shaped ring member configured for being rotatably attached to a substrate member.

2. The D-ring handle of claim 1, wherein the curved leg of the D-shaped ring member is hingedly attached to the base of the D-shaped ring member.

3. The D-ring handle of claim 2, wherein the at least one tab connected to the base includes two integrally attached tabs.

4. The D-ring handle of claim 3, wherein the curved leg is hingedly attached to the base of the D-shaped ring member by a pin member, the pin member configured for passing through the base and for insertion into the ends of the curved leg.

5. The D-ring handle of claim 4, additionally comprising: a spring member slideably positioned along the pin member.

6. The D-ring handle of claim 5, wherein the spring member is a coil spring biased to force the D-shaped ring member inward.

7. The D-ring handle of claim 1, wherein the curved leg includes two protrusions on the curved leg, the protrusions extending substantially perpendicular to the curved leg.

8. The D-ring handle of claim 7, wherein the base includes a bolt at each end of the base.

9. The D-ring handle of claim 1, additionally comprising: a substrate member.

10. The D-ring handle of claim 1, wherein the base includes a top edge, and the at least one tab is integrally connected to the top edge of the base.

11. A handle comprising:

(a) a ring member including, a curved leg and a base, the base pivotally coupled to the curved leg;

(b) at least one tab connected to the base, the base configured with respect to the curved leg such that pressure on the at least one tab moves the base and the curved leg outward; and, (c) the ring member configured for being rotatably attached to a faceplate.

12. The handle of claim 11, wherein the curved leg is hingedly attached to the base by a pin member.

13. The handle of claim 12, additionally comprising: a spring member slideably positioned along the pin member.

14. The handle of claim 13, wherein the spring member is a coil spring biased to force the D-shaped ring member inward.

15. The handle of claim 12, wherein the curved leg includes two protrusions substantially perpendicular to the curved leg.

16. The handle of claim 11, wherein the base includes a bolt at each end of the base.

17. The handle of claim 11, additionally comprising: a faceplate.

18. The handle of claim 11, wherein the base includes a top edge, and the at least one tab is integrally connected to the top edge of the base.

19. A D-ring handle, comprising:

(a) a D-shaped ring member configured for being hingedly attached to a faceplate, the D-shaped ring member including, a curved leg, a base, and a pin member, the curved leg and the base pivotally coupled to one another by a pin member, the pin member passing through the base and at least portions of the pin member extending into the ends of the curved leg;

(b) at least one tab connected to the base, the base of the D-shaped ring member configured for being rotatably attached to a foot member, the foot member including a pair of opposed supports configured for receiving the pin member, and the foot member, configured for rotating relative to the faceplate to actuate a latch member;

(c) the at least one tab connected to the base including two integrally attached tabs;

(d) the base further including a bolt at each end of the base;

(e) a spring member slideably positioned along the pin member; and, (f) the curved leg includes two protrusions extending substantially perpendicular to the curved leg.

20. The D-ring handle of claim 19, wherein the spring member is a coil spring biased to force the D-shaped ring member inward.

21. The D-ring handle of claim 19, additionally comprising: a faceplate.

22. The D-ring handle of claim 19, wherein the base includes a top edge, and the tabs are integrally connected to the top edge of the base.

* * * * *